US006247364B1

United States Patent
Kicher et al.

(10) Patent No.: US 6,247,364 B1
(45) Date of Patent: Jun. 19, 2001

(54) ACCELERATION TRANSDUCER AND METHOD

(75) Inventors: Thomas P. Kicher, Willoughby Hills; Paul T. Kicher, Wickliffe, both of OH (US)

(73) Assignee: Thomas P. Kicher & Co., Willoughby Hills, OH (US)

(*) Notice: Subject to any disclaimer, the term of this patent is extended or adjusted under 35 U.S.C. 154(b) by 0 days.

(21) Appl. No.: 09/157,017

(22) Filed: Sep. 18, 1998

Related U.S. Application Data

(60) Provisional application No. 60/065,948, filed on Oct. 27, 1997.

(51) Int. Cl.[7] ............................................. G01P 15/12
(52) U.S. Cl. ............................................. 73/514.33
(58) Field of Search ....................... 73/514.33, 514.29, 73/514.32, 514.34, 514.36, 514.37, 514.38, 514.06, 514.12, 514.15, 514.16; 338/2, 5, 42

(56) References Cited

U.S. PATENT DOCUMENTS

| | | |
|---|---|---|
| 3,415,116 | 12/1968 | Knechtel. |
| 3,492,864 | 2/1970 | Kraeling et al.. |
| 3,693,425 * | 9/1972 | Starita et al. ................. 73/514.33 |
| 3,695,096 | 10/1972 | Kutsay ........................... 73/141 A |
| 3,817,091 | 6/1974 | Frederick ............................ 73/84 |
| 3,931,729 | 1/1976 | Frederick ............................ 73/84 |
| 3,946,598 | 3/1976 | Towne et al. ...................... 73/67.1 |
| 4,052,884 | 10/1977 | Milberger et al. ................... 73/84 |
| 4,064,763 * | 12/1977 | Srinivasan ....................... 73/514.12 |
| 4,065,971 * | 1/1978 | Shimazoe et al. .................. 73/727 |
| 4,102,210 * | 7/1978 | Couston et al. .................... 73/727 |
| 4,332,160 | 6/1982 | Baragar et al. ...................... 73/84 |
| 4,348,142 | 9/1982 | Figour ................................ 414/2 |
| 4,364,259 | 12/1982 | Muranaka et al. .................. 73/654 |
| 4,399,705 | 8/1983 | Weiger et al. ...................... 73/654 |
| 4,400,970 | 8/1983 | Ali ..................................... 73/84 |
| 4,448,083 | 5/1984 | Hayashi ....................... 73/862.04 |
| 4,483,203 | 11/1984 | Capper ........................ 73/862.04 |
| 4,503,351 | 3/1985 | Sonderegger et al. ............ 73/329 |
| 4,574,616 | 3/1986 | Miura et al. ........................ 73/35 |
| 4,586,366 | 5/1986 | Milberger ........................... 73/84 |
| 4,671,118 | 6/1987 | Hatamura ..................... 73/862.04 |
| 4,672,839 | 6/1987 | Takeuchi et al. .................... 73/35 |
| 4,704,894 | 11/1987 | Inuzuka et al. ............... 73/862.48 |
| 4,841,783 | 6/1989 | Marshek et al. .................... 73/35 |
| 4,938,065 * | 7/1990 | Kobayashi ..................... 73/514.33 |
| 4,959,993 | 10/1990 | Komurasaki ...................... 73/721 |

(List continued on next page.)

*Primary Examiner*—Helen Kwok
(74) *Attorney, Agent, or Firm*—Renner, Otto, Boisselle & Sklar, LLP

(57) ABSTRACT

A high strength, high frequency acceleration transducer is used for measuring the acceleration of an impacted machine or structure. The acceleration transducer includes a diaphragm, the diaphragm including one or more strain gages for producing an output signal indicative of the transducer flexure. The diaphragm is securely clamped or held over part of its surface, and is free to deflect over other parts, for example, the remainder of its surface—the diaphragm can be clamped or held along its circumference with its middle free to flex, or alternatively the diaphragm can be clamped or held along its center with the outside portion of the diaphragm free to flex. The diaphragm preferably includes one or more holes positioned relative to the strain gages to concentrate the strains locally within the diaphragm towards the strain gages. Due to the small size, profile, shape, and configuration, the acceleration transducer is able to withstand high impact forces and reliably to measure acceleration without being damaged and while avoiding resonance or the like which would degrade the output signal from the strain gages.

78 Claims, 11 Drawing Sheets

U.S. PATENT DOCUMENTS

| | | | |
|---|---|---|---|
| 4,984,467 | 1/1991 | Haefner | 73/84 |
| 5,125,266 | 6/1992 | Ingram et al. | 73/35 |
| 5,150,606 | 9/1992 | Komurasaki | 73/35 |
| 5,212,421 * | 5/1993 | Hatton et al. | 310/329 |
| 5,226,325 | 7/1993 | Komurasaki et al. | 73/35 |
| 5,259,240 | 11/1993 | Raines et al. | 73/84 |
| 5,295,389 * | 3/1994 | Nagata et al. | 73/25.03 |
| 5,295,399 | 3/1994 | Grant et al. | 73/862.043 |
| 5,297,430 | 3/1994 | Sonderegger et al. | 73/862.68 |
| 5,329,819 * | 7/1994 | Park et al. | 73/724 |
| 5,351,542 * | 10/1994 | Ichimura et al. | 73/514.33 |
| 5,377,551 | 1/1995 | Vacquer | 73/84 |
| 5,412,986 * | 5/1995 | Beringhause et al. | 73/514.33 |
| 5,811,910 * | 9/1998 | Cameron et al. | 73/514.01 |
| 5,822,173 * | 10/1998 | Dague et al. | 73/718 |

* cited by examiner

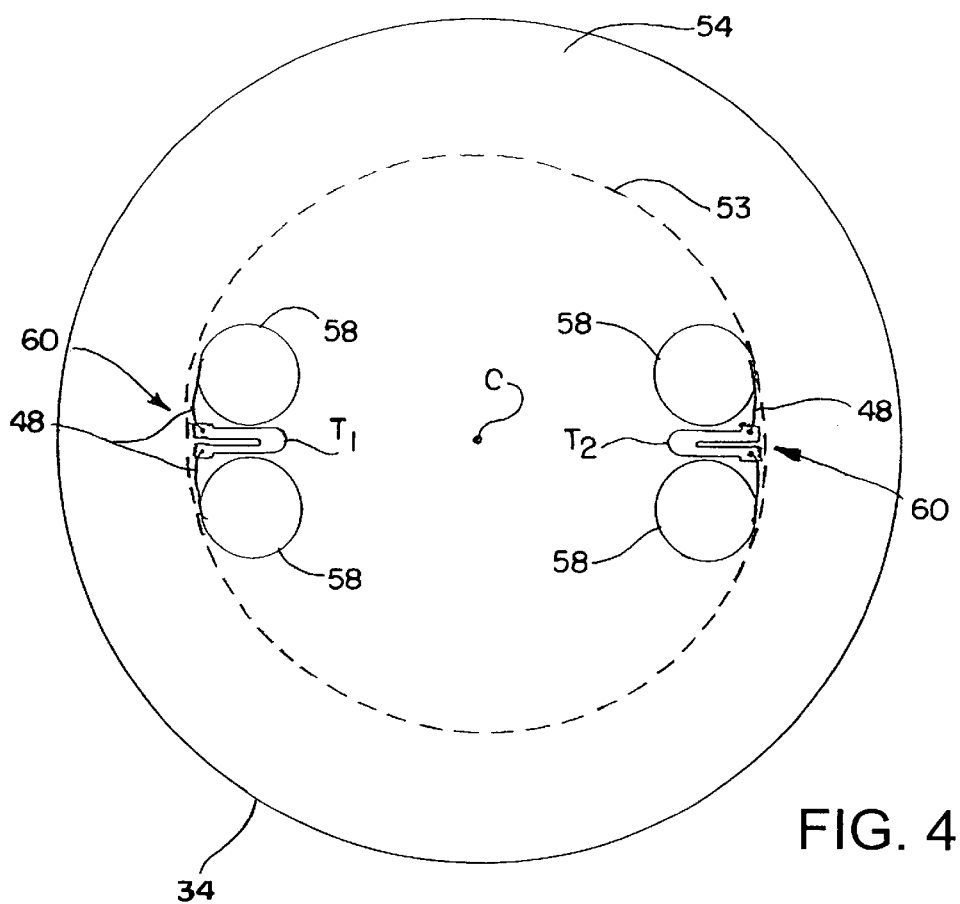
FIG. 4
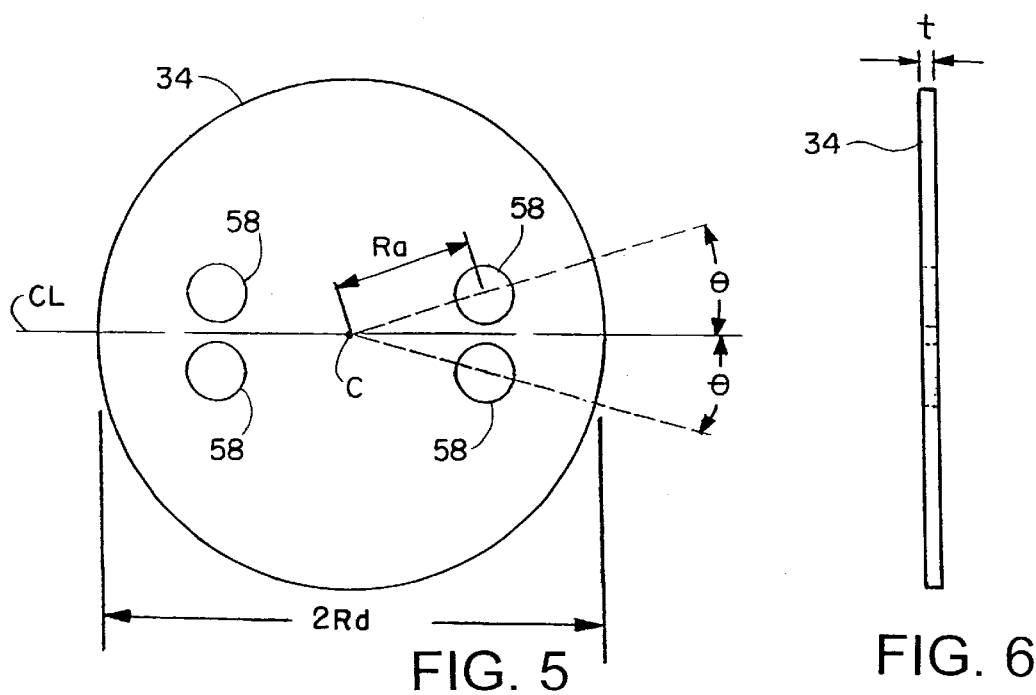
FIG. 5
FIG. 6

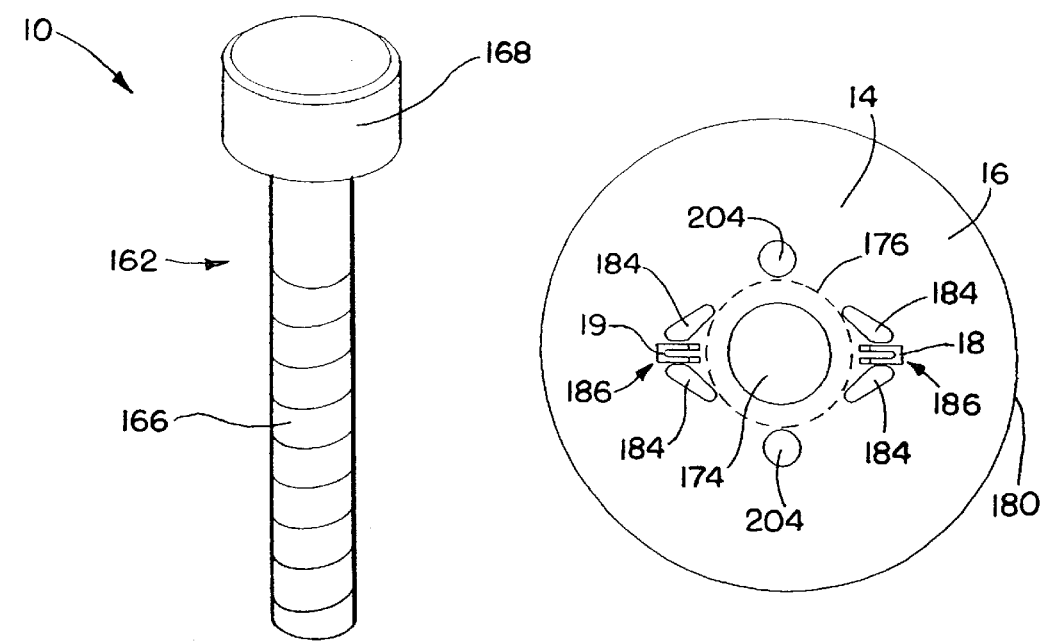
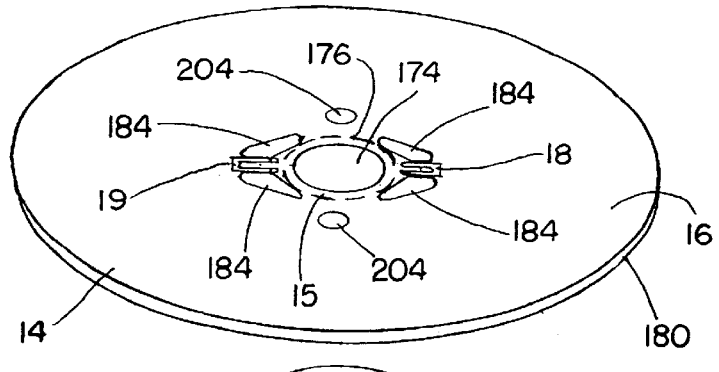
FIG. 15
FIG. 13
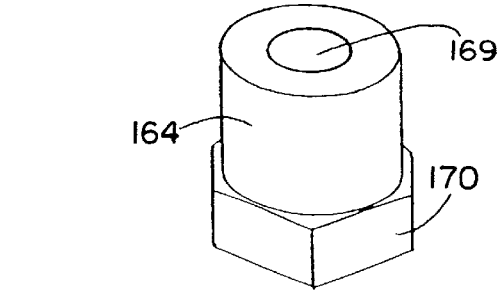
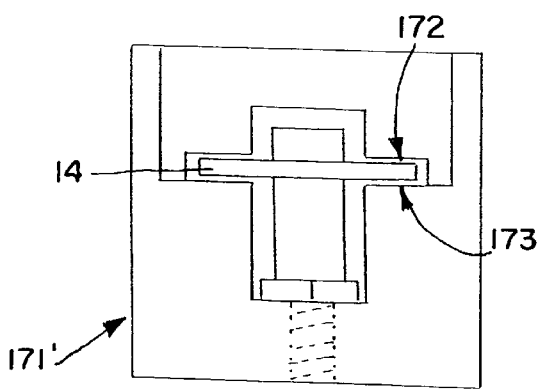
FIG. 14

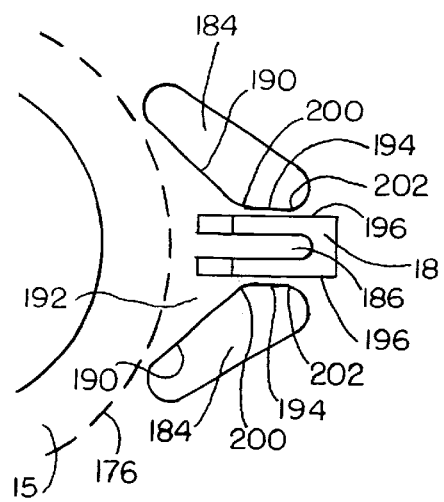
FIG. 17
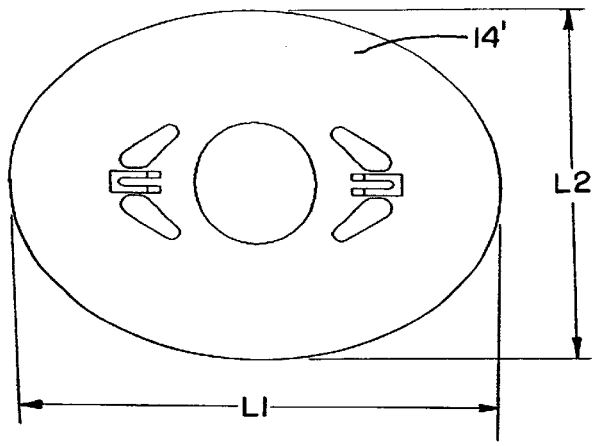
FIG. 18
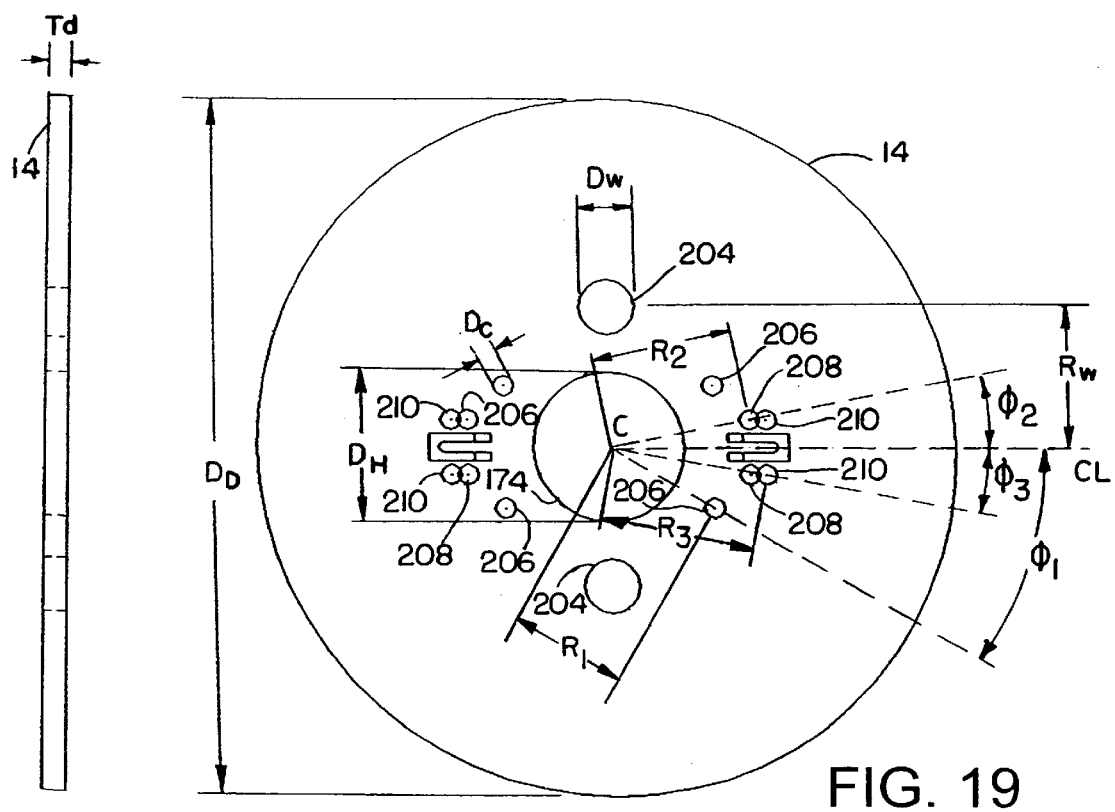
FIG. 19
FIG. 20

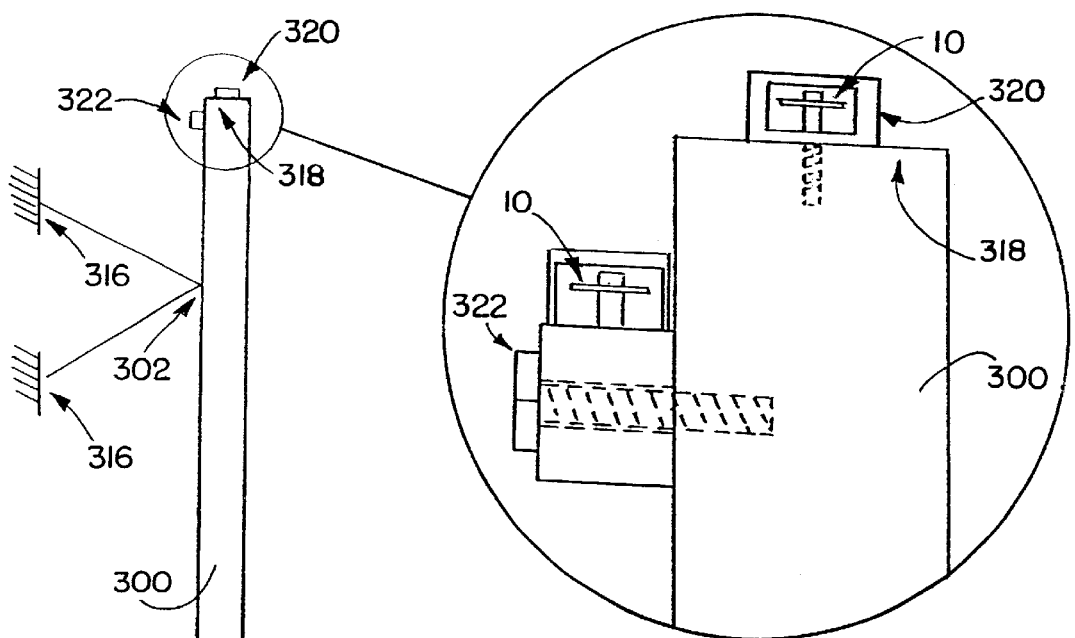
FIG. 23
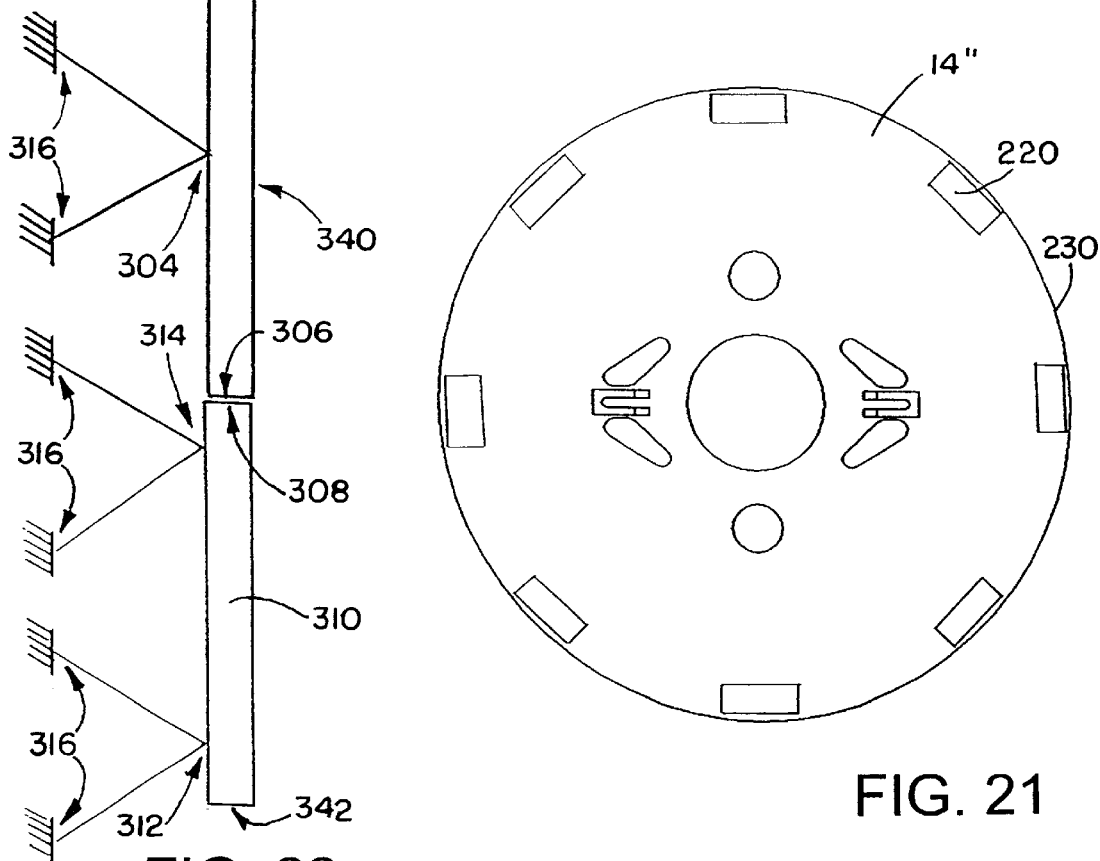
FIG. 21
FIG. 22

ACCELERATION TRANSDUCER AND METHOD

CROSS-REFERENCE TO RELATED APPLICATION

This application claims the benefit of U.S. Provisional Application No. 60/065,948 filed Oct. 27, 1997.

TECHNICAL FIELD

The present invention relates to acceleration transducers and, more particularly, to acceleration transducers for measuring acceleration resulting from impact loading such as can occur in pile driving, impact forming or explosion. The invention is useful in a variety of applications, from slow vibratory applications to impact response applications. An exemplary embodiment of the invention is particularly useful for measuring steel-on-steel impact.

BACKGROUND OF THE INVENTION

Accelerometers for measuring impact behavior must exhibit a high capacity for measuring magnitude and a wide frequency range to capture the full range of signal.

It is desirable that the accelerometer have a first resonant frequency in excess of 20 kilohertz (KHz), thereby allowing it to capture the important components of the stress-wave signal. Consequently, the accelerometer needs to be very rigid and small in size to possess the desired resonant frequency.

There is a strong need in the art for a means for evaluating acceleration resulting from impact loading. In particular, there is a strong need in the art for an accelerometer which is better able to withstand the high impact forces involved in acceleration such as impact forming or blanking and which measures the acceleration and velocity of the tool while still providing a low noise output. This is in contrast to larger strain gage devices and accelerometers used in the prior art which have been found to encounter substantial resonance and other signal degrading conditions making it difficult to measure the acceleration characteristics of a machine under the high impact conditions to which it is exposed.

SUMMARY OF THE INVENTION

According to the present invention, a high strength, high frequency acceleration transducer is used for measuring the acceleration of an impacted machine or structure. The acceleration transducer includes a diaphragm, the diaphragm including one or more strain gages for producing an output signal indicative of the diaphragm flexure. The diaphragm is securely clamped or held over part of its surface, and is free to deflect over other parts, for example, the remainder of its surface—the diaphragm can be clamped or held along its circumference with its middle free to flex, or alternatively the diaphragm can be clamped or held along its center with the outside portion of the diaphragm free to flex. The diaphragm preferably includes a strain concentration mechanism to concentrate the strains locally within the diaphragm towards the strain gages. Due to the small size, profile, shape, and configuration, the acceleration transducer is able to withstand high impact forces and reliably to measure acceleration without being damaged and while avoiding resonance or the like which would degrade the output signal from the strain gages.

In accordance with one aspect of the invention, an acceleration transducer includes a diaphragm responsive to inertially-induced deformations so as to exhibit stress, strain, and deflection; a support attached to a part of the diaphragm; and at least one detector for producing an output in response to the deformations.

In accordance with another aspect, an acceleration transducer includes a diaphragm responsive to inertially-induced deformations so as to exhibit stress, strain, and deflection; a support for holding the diaphragm; and at least one detector for producing an output in response to the strain.

In accordance with yet another aspect, an acceleration transducer includes a housing, a diaphragm disposed within the housing such that the circumference of the diaphragm is rigidly secured or held within the housing and a central portion of the diaphragm is sufficiently free to deflect in response to acceleration of the housing, and at least one strain gage secured to the diaphragm for producing an output representative of the acceleration, the at least one strain gage being located towards an outer radial portion or circumferential portion of the diaphragm, or in any event in the region of measurable strain.

In accordance with still another aspect, an acceleration transducer includes a housing, a diaphragm disposed within the housing such that a central portion of the diaphragm is rigidly secured or held within the housing and the circumference of the diaphragm is sufficiently free to deflect in response to acceleration of the housing, and at least one strain gage secured to the diaphragm for producing an output representative of the acceleration, the at least one strain gage being located towards the central portion of the diaphragm, or in any event in the region of measurable strain.

In accordance with a further aspect, a method of evaluating the integrity of a bar or other object includes the steps of securing a mounting block to the bar to be impacted, securing an acceleration transducer to the mounting block, and monitoring an output of the acceleration transducer in response to impacting the bar.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 4 is a plan view of an exemplary diaphragm with strain gages thereon in accordance with the present invention;

FIG. 5 is a top schematic view of the diaphragm of FIG. 4 illustrating the relative placement of the apertures in accordance with the present invention;

FIG. 6 is a side view of the diaphragm of FIG. 5;

FIG. 13 is an exploded view of the acceleration transducer of FIG. 1;

FIG. 14 is a sectional view of a transducer housing having mechanical stops which limit deformations of the diaphragm of the acceleration transducer of FIG. 1;

FIG. 15 is a plan view of the diaphragm of the acceleration transducer of FIG. 1;

FIG. 17 is a plan view showing the details of the apertures in the diaphragm of FIG. 15 in the vicinity of a strain gage;

FIG. 18 is a plan view of the diaphragm in accordance with another embodiment of the invention;

FIG. 19 is a top schematic view of the diaphragm of FIG. 15 illustrating the relative placement of the apertures in accordance with an exemplary embodiment of the present invention;

FIG. 20 is a side view of the diaphragm of FIG. 19;

FIG. 21 is plan view of a diaphragm having added masses, in accordance with yet another embodiment of the invention;

FIG. 22 is a system view of a Hopkinson bar impact test application illustrating possible placements of acceleration transducers of the present invention;

FIG. 23 is a magnified view of the acceleration transducers and associated mounting blocks shown in FIG. 22;

DESCRIPTION OF THE PREFERRED EMBODIMENT

Figure 1:
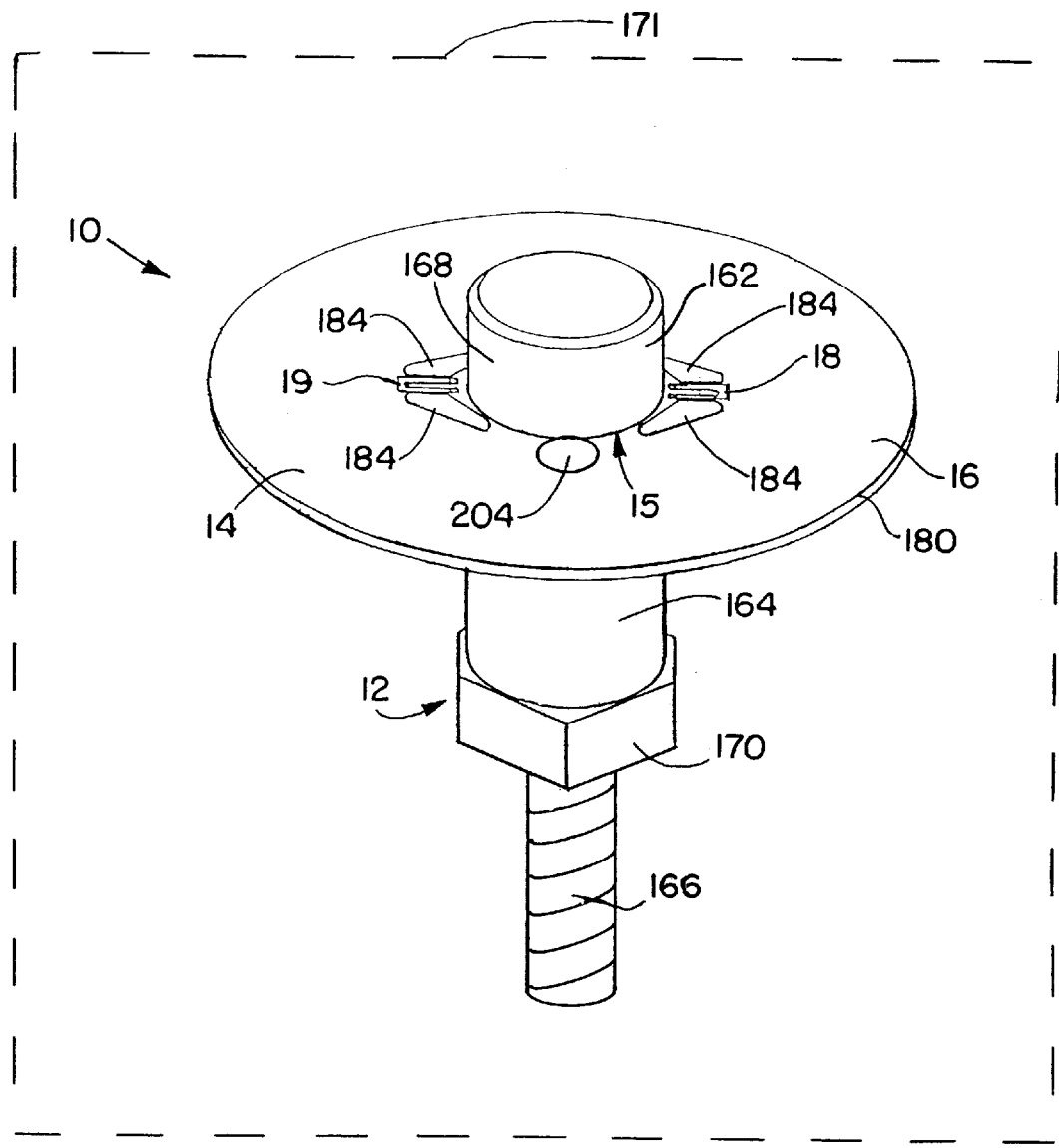
FIG. 1 is a perspective view of a center-mounted acceleration transducer in accordance with a preferred embodiment the present invention.

The acceleration transducer of the present invention will now be described with reference to the drawings, wherein like reference numerals are used to refer to like elements throughout.

Referring initially to FIG. 1, one embodiment in accordance with the present invention, a center-mounted acceleration transducer, is generally designated 10. The transducer 10 includes a mounting support 12 which attaches to a diaphragm 14 at an attachment portion 15 thereof, leaving a flexure portion 16 thereof free to flex in response to inertial forces. Strain gages 18 and 19 are attached to the diaphragm 14 to function as a detector for measuring the flexure of the diaphragm 14.

The attachment portion 15 will preferably be rigidly secured by the support 12, since rigidly securing the attachment portion 15 will generally maximize the flexing response of the flexure portion 16. However, it will be appreciated that the attachment of the attachment portion 15 by the support 12 may be other than rigidly securing the attachment portion 15, leaving at least part of the attachment portion 15 free to flex. For example, the attachment may be an elastic coupling, a hinged connection, or involve some form of viscous damping.

In addition, it will be appreciated that attachment of a mounting support for a diaphragm need not be at the center of the diaphragm in order for a portion of the diaphragm to be left free to flex. The mounting support would preferably be attached at the center of the diaphragm, as shown in FIG. 1 for the transducer 10, but may also be attached along the circumference of the diaphragm, or at some portion of the diaphragm between the center and the circumference.

Figure 2:
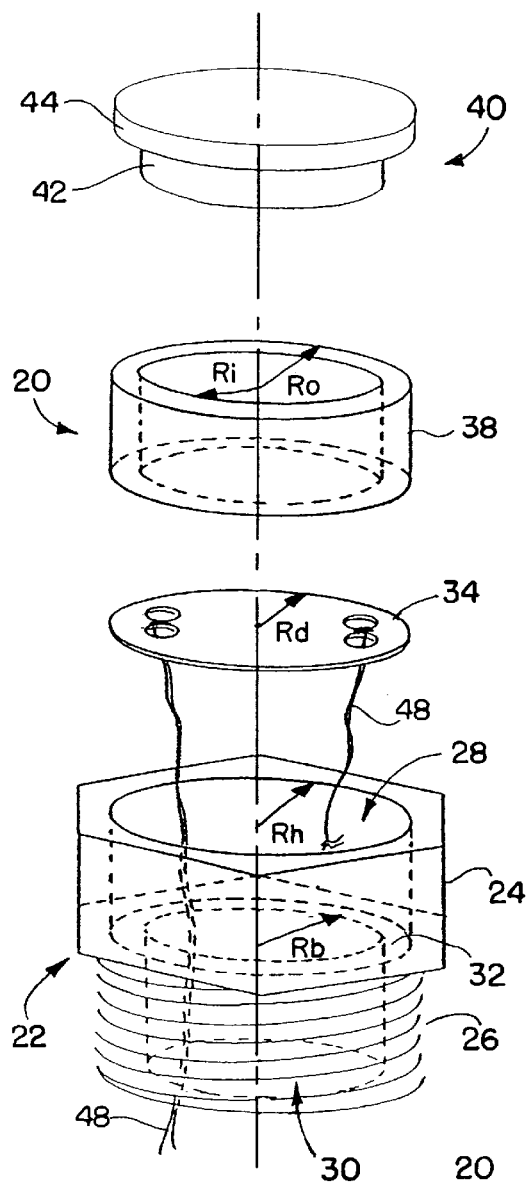
FIG. 2 is an exploded view of an edge-mounted acceleration transducer in accordance with the present invention.

For example, FIG. 2 shows an alternate embodiment of the present invention, an edge-mounted acceleration transducer which is generally designated 20. The transducer 20, shown in exploded view, includes a housing 22 having a head portion 24 and a threaded base portion 26. The head portion 24 is integrally formed with the base portion 26 to form a generally hex bolt shape. The head portion 24 includes a central bore 28, having a radius Rh, which is concentric with a central bore 30 through the base portion 26. The central bore 30 has a radius Rb where Rh>Rb. A step 32 is formed by the annular planar surface where the central bore 28 meets the central bore 30 as shown.

A circular diaphragm 34 having a radius Rd is seated flat on the step 32 so as to be supported around its entire circumference by the step 32. Preferably, Rb<Rd<Rh and Rd is slightly smaller than Rh to allow insertion of the diaphragm 34 within the central bore 28. A clamping ring 38 having an outer radius Ro and an inner radius Ri is insertable into the central bore 28 for rigidly securing the diaphragm 34 between the step 32 and the bottom of the clamping ring 38. In the preferred embodiment, the outer radius Ro of the clamping ring 38 is approximately equal to the radius Rh of the central bore 28 such that the clamping ring 38 can be press fit into the central bore 28 and remain tightly secured. The inner radius Ri of the clamping ring 38 is preferably equal to the radius Rb of the central bore 30 such that the diaphragm 34 is securely held equally on both sides.

The transducer 20 further includes a cap 40 which covers the clamping ring 38 and diaphragm 34. The cap 40 preferably forms a seal which prevents moisture, dirt and debris from entering the head portion 24 and protects the strain gages (not shown) on the diaphragm 34 from the environment. In the exemplary embodiment, the cap 40 has a lower portion 42 having a radius which is approximately equal to the inner radius Ri of the clamping ring so as to allow the lower portion 42 to be press fit into the clamping ring 38. A flange portion 44 of the cap has a radius which is slightly smaller than the radius Rh of the head portion 24 such that the flange portion 44 can be recessed flush with the upper surface of the head portion 24 as seen in FIG. 2. The radii of the lower portion 42 and/or flange portion 44 may be slightly tapered to facilitate press-in assembly of the cap 40 in the housing 22. The outer circumference of the flange portion 44 is thus seated flat on the top surface of the clamping ring 38.

Figure 3:
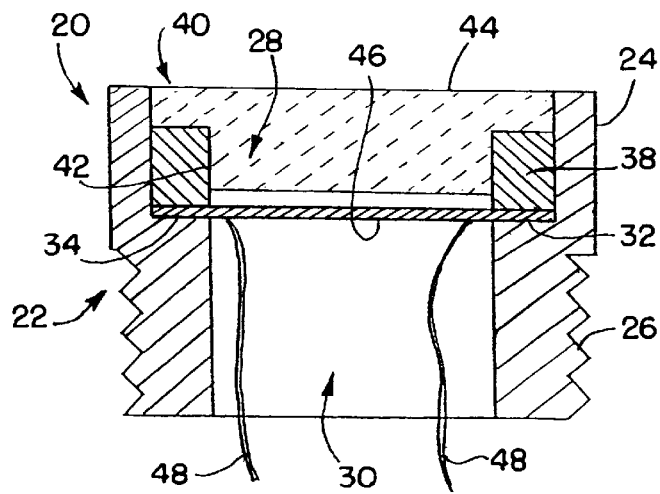
FIG. 3 is a sectional view of the acceleration transducer of FIG. 2 in accordance with the present invention.

FIG. 3 illustrates the fully assembled transducer 20. As is shown, the diaphragm 34 is rigidly secured around its entire circumference between the clamping ring 38 and step 32 of the housing 22. A central portion 46 of the diaphragm is free from obstruction and can flex in either direction in response to movement of the housing 22. The threaded base portion 26 allows the transducer 20 to be secured to an object whose acceleration is to be measured. Wire leads 48 connected to strain gages (not shown) on the diaphragm 34 extend from the transducer 20 through the central bore 30. The leads 48 are connected to appropriate circuitry (not shown) for processing the output of the strain gages in order to determine acceleration as is discussed more fully below in connection with FIG. 7.

Turning now to FIG. 4, a top view of the diaphragm 34 is provided. The dotted line denotes an area 54 (sometimes referred to as a circumference or circumferential area) which is held by the clamping ring 38 and housing 22. In accordance with the preferred embodiment, the diaphragm 34 includes strain gages T1 and T2 which are mounted on the same side of the diaphragm diametrically opposite each other and radially inward of the area 54. The strain gages T1 and T2 are designed to measure the tensile strains which are present in the diaphragm 34 during downward flexure. The strain gages T1 and T2 are preferably located radially outward from the center C of the diaphragm 34.

In order to increase the sensitivity of the transducer 20 via the strain gages T1 and T2, the present invention includes a strain concentration mechanism such as a pair of apertures 58 positioned adjacent each strain gage on opposite sides. The apertures 58 tend to exaggerate the strain which is incurred by the flexing diaphragm 34 towards the middle regions 60 where the respective strain gages are located. Hence, the present invention is able to provide a transducer having a high first resonant frequency while still obtaining a suitable output response from the strain gages. Although FIG. 4 only shows strain gages T1 and T2, the opposite side of the diaphragm includes strain gages C1 and C2 for measuring compression type strains in the diaphragm 34 during upward flexure. The strain gages C1 and C2 (not shown) are positioned in the same manner as gages T1 and T2 between the aperture pairs 58, but simply on the other side of the diaphragm 34. The strain gages T1 and C1, and T2 and C2 can be connected in complementary fashion such that the tensile strain measured by T1 is common to the compression strain measured by C1, for example.

The strain gages T1 and T2 measure tensile strains while the strain gages C1 and C2 measure compression strains when the deflection of the diaphragm is downward relative to the illustration in the drawings. On an upward excursion of the diaphragm the strain reverses, i.e., strain gages T1 and T2 become compressive while strain gages C1 and C2 become tensile. The placement of the strain gages and corresponding reversal of strain facilitates the connecting and operating of the strain gages in a Wheatstone Bridge circuit described further below.

Although FIG. 4 shows a particular arrangement of the apertures and strain gages in accordance with the present invention, it will be appreciated that other combinations and arrangements are possible. For example, the diaphragm may include more than four strain gages and apertures. Preferably, however, for a perimeter-clamped embodiment such as the one shown in FIGS. 2–4, the strain gages are located toward the outer radial portion of the diaphragm in order to capture the largest radial strain. In addition, one or more apertures are provided for concentrating the strains incurred by the diaphragm towards the strain gages.

FIG. 5 illustrates the relevant dimensions of the diaphragm 34 in accordance with an exemplary embodiment of the transducer. The diaphragm 34 has a diameter (2*Rd) of 0.5313 inch, which is approximately equal to the outer diameter of the clamping ring (2*Ro). The apertures 58 are circular holes having a diameter of 0.0760 inch and which are centered at a radius Ra equal to 0.1652 inch from the center C of the diaphragm 34. Each aperture 58 is offset from a center line CL (on which the strain gages are located) by an angle θ, where θ equals 17.9°. The apertures 58 preferably have sharp edges and no burrs. As is shown in FIG. 6, the diaphragm 34 has a thickness t of 0.0135 inch, and is flat to within 0.0001 inch TIR. The inner diameter of the clamping ring 38 is preferably about 0.4063 inch (2*Ri) as is the diameter of the central bore 30. Thus, the central portion 46 (FIG. 3) of the diaphragm 34 has a diameter of approximately 0.4063 inch also.

The diaphragm 34 is preferably made of a hardened, corrosion resistant, fatigue resistant material. Exemplary materials are 316-type stainless steel, 304-type stainless steel, titanium, or other materials that have suitable properties. In addition, preferably the housing 22, clamping ring 38 and cap 40 are made of the same material as the diaphragm 34 so as to avoid galvanic corrosion and thermal mismatch, which may result in temperature-induced strain, between the respective components. Also, in the illustrated and described embodiment the diaphragm 34 is made of stainless steel, which is electrically conductive; therefore, the strain gages T1–T2 and C1–C2, and, if necessary, their associated leads, are mounted on the diaphragm in a manner to avoid shorting.

If the diaphragm 34 is made of an electrically non-conducting material, the adhesive used for mounting the strain gages and their associated leads need not be electrically non-conducting. Alternatively, if the diaphragm 34 is made of an electrically non-conducting material the strain gages could be formed directly on the diaphragm using a photolithography process.

A transducer 20 having the above-described construction has been found to have a first resonant frequency of over 20 KHz, due mainly to the small size and stiffness of the diaphragm and the small size and placement of the strain gages. The strain gages T1–T2 and C1–C2 are of commercially available design and are preferably of a semiconductor variety (e.g., silicon) which are bonded on the diaphragm 34 using established techniques in the regions 60 (FIG. 4). Such strain gages in combination with the diaphragm 34 have been found to produce an output response (normalized with respect to the voltage supplied to the below-described Wheatstone Bridge) on the order of 0.0063 millivolts/volt (mV/V) to 0.0019 mV/V per g acceleration, where "g" is equal to the acceleration of gravity. In addition, the transducer is capable of measuring on the order of 10,000 g's of acceleration. In another embodiment, other types of strain gages can be used such, as foil type gages, etc. In either case, an extremely clean signal can be received from the strain gages.

It will be appreciated that although the transducer 20 has been described above with respect to particular dimensions, materials, aperture arrangements, etc., the present invention is not necessarily limited to such dimensions, materials, etc. Such specific information is presented primarily for exemplary purposes. Other materials, dimensions, aperture arrangements, strain gage configurations, strain gage types, etc., can be used without departing from the scope of the invention.

Figure 7:
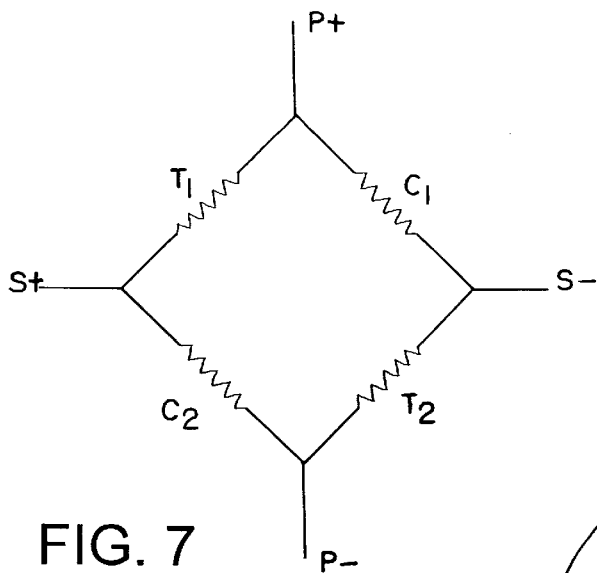
FIG. 7 is a schematic diagram of the wiring connections between the respective strain gages in accordance with the present invention.

Turning now to FIG. 7, the general wiring diagram for the strain gages T1–T2 and C1–C2 is shown. As can be seen, the strain gages are configured as part of a Wheatstone Bridge. Specifically, strain gages T1, C1, T2 and C2 are connected together end-to-end to form the four arms of the Wheatstone Bridge. The node between gages T1 and C1 serves as the P+ terminal. The node between gages C1 and T2 serves as the S− terminal. The node between gages T2 and C2 serves as the P− terminal, and the node between gages C2 and T1 serves as the S+ terminal. Wire leads 48 from the respective P+, P−, S+ and S− terminals are bonded to the strain gages and extend from the diaphragm through the central bore 30 as shown in FIG. 2. The leads 48 allow the gages to be connected to the appropriate external circuitry (not shown) for analyzing the signal from the Wheatstone Bridge formed by the strain gages. Also, the wire leads 48 can extend through the apertures 58 as shown in FIG. 4 and can serve as a means for providing a connection between the strain gages T1 and T2 on the top surface of the diaphragm 34 and the strain gages C1 and C2 on the bottom surface of the diaphragm 34. Thus, in addition to acting to concentrate the strain in the diaphragm 34 towards the strain gages, the apertures 58 serve as holes through which the wire leads 48 can be fed.

As mentioned above, the wire leads 48 are used for connecting the Wheatstone Bridge formed by the strain gages to external circuitry (not shown) for processing the output of the Wheatstone Bridge. Such external circuitry may include circuitry to balance the bridge and/or to provide power and calibration. Such circuitry is considered conventional and, consequently, further detail has been omitted.

Although connection of the strain gages in a Wheatstone Bridge is preferred, it will be appreciated that the resistance of the strain gages may be measured directly, for example by use of an ohmmeter.

Figure 8:
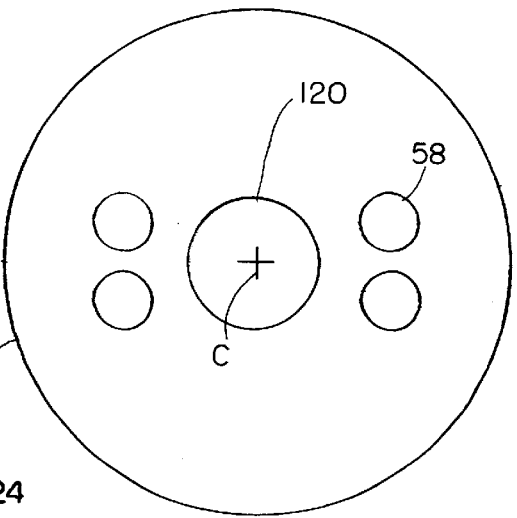
FIG. 8 is a plan view of a diaphragm in accordance with yet another embodiment of the present invention.

FIG. 8 illustrates another embodiment of a diaphragm 34' which can be used in place of the diaphragm 34 shown in FIG. 2. Specifically, the diaphragm 34' differs from the diaphragm 34 only in that it includes an added mass 120 located in the center of the diaphragm. Such a mass tends to increase the sensitivity of the strain gages (not shown); however, the increase in sensitivity can be at the expense of a loss in the high end frequency response of the transducer. The removal of mass, such as by providing a further hole in the diaphragm, e.g., at the center where the illustrated mass is located, would produce the opposite effect. A hole decreases sensitivity while increasing frequency response; a mass increases sensitivity but decreases frequency response.

Figure 9:
FIG. 9 is a side view of a diaphragm in accordance with still another embodiment of the present invention.

FIG. 9 shows still another embodiment of the diaphragm designated 34". In this embodiment, the diaphragm 34" differs from those in the other embodiments in that the diaphragm is made of a laminated material. The laminations may be designed to provide the necessary damping to achieve a desired frequency response and strain signal, and may be used in the other embodiments hereof. Other variations in the design of the diaphragm will be apparent in view of the description herein.

Figure 10:
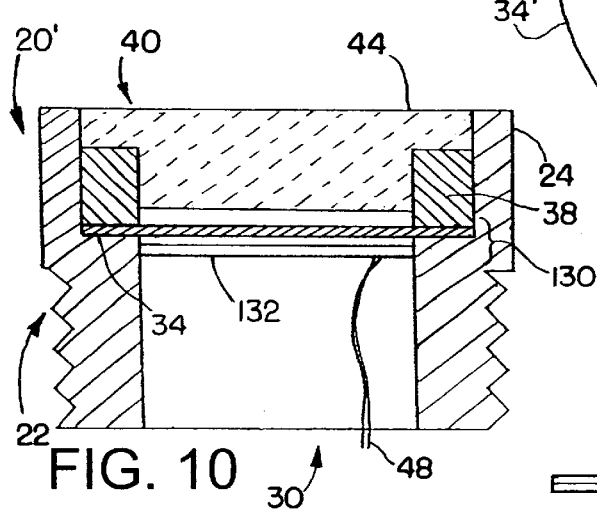
FIG. 10 is a sectional view of an acceleration transducer in accordance with another embodiment of the present invention.

FIG. 10 shows an embodiment of the invention in which a transducer 20' is used as an inertia sensing device. The embodiment of FIG. 10 is similar to that shown in FIG. 3 with the exception that the diaphragm 34 serves as one plate of a capacitive element 130. If desired, the diaphragm 34 in the transducer 20' may be solid, e.g., without holes 58, since it may not be necessary to connect leads or conductors through the diaphragm, as it is used as part of a capacitive element. The capacitive element 130 includes capacitance sensing probe 132 and a dielectric material located between the diaphragm 34 and the probe 132. As the capacitive element 130 flexes due to changes in the inertia of the transducer 20', the capacitance of the element 130 changes as measured across wires 48 which are connected to the respective plates.

Figure 11:
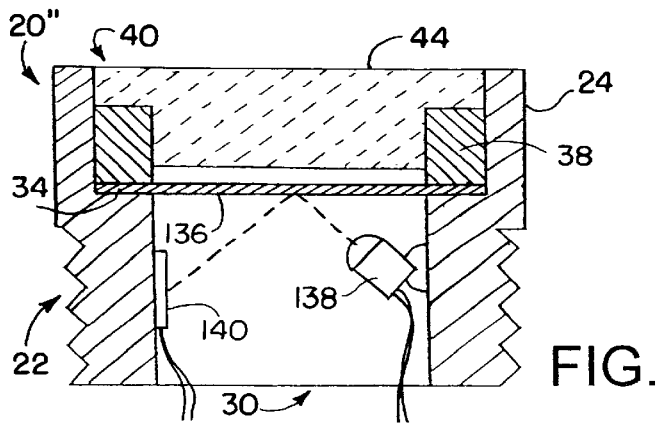
FIG. 11 is a sectional view of an acceleration transducer according to yet another embodiment of the present invention.

FIG. 11 shows another embodiment of an inertia sensing device. The device 20" includes a diaphragm 34 which is reflective on its lower face 136. A light source 138 is mounted on one side of the central bore 30 and a light detector 140 is mounted on the other side as is shown. The output from the light source 138 is directed towards the diaphragm 34 so as to be reflected therefrom and received by the detector 140 as shown in dotted line. The light may be directed at the middle of the diaphragm which likely will undergo maximum deflection in use; but the light may be directed elsewhere, if desired. As the diaphragm 34 flexes, the location at which the light from the light source 138 is incident on the detector 140 will vary. By configuring the light detector 140 such that the output therefrom varies as a function of where the light strikes the detector, an indication of the inertia of the object to which the device 20" is connected to can be obtained. An exemplary light detector 140 may be a photodiode array or a CCD array as will be appreciated, the output of the array varying as a function of the spatial location at which the light from the light source 138 is incident on the detector 140.

Although the inertia sensing device 20" is described above in terms of detecting reflected light, it will be appreciated that the same principle may employed in an inertia sensing device reflecting sound waves, radio waves, microwaves, or other sorts of radiation, by substituting suitable sources and detectors for the light source 138 and the light detector 140.

Figure 12:
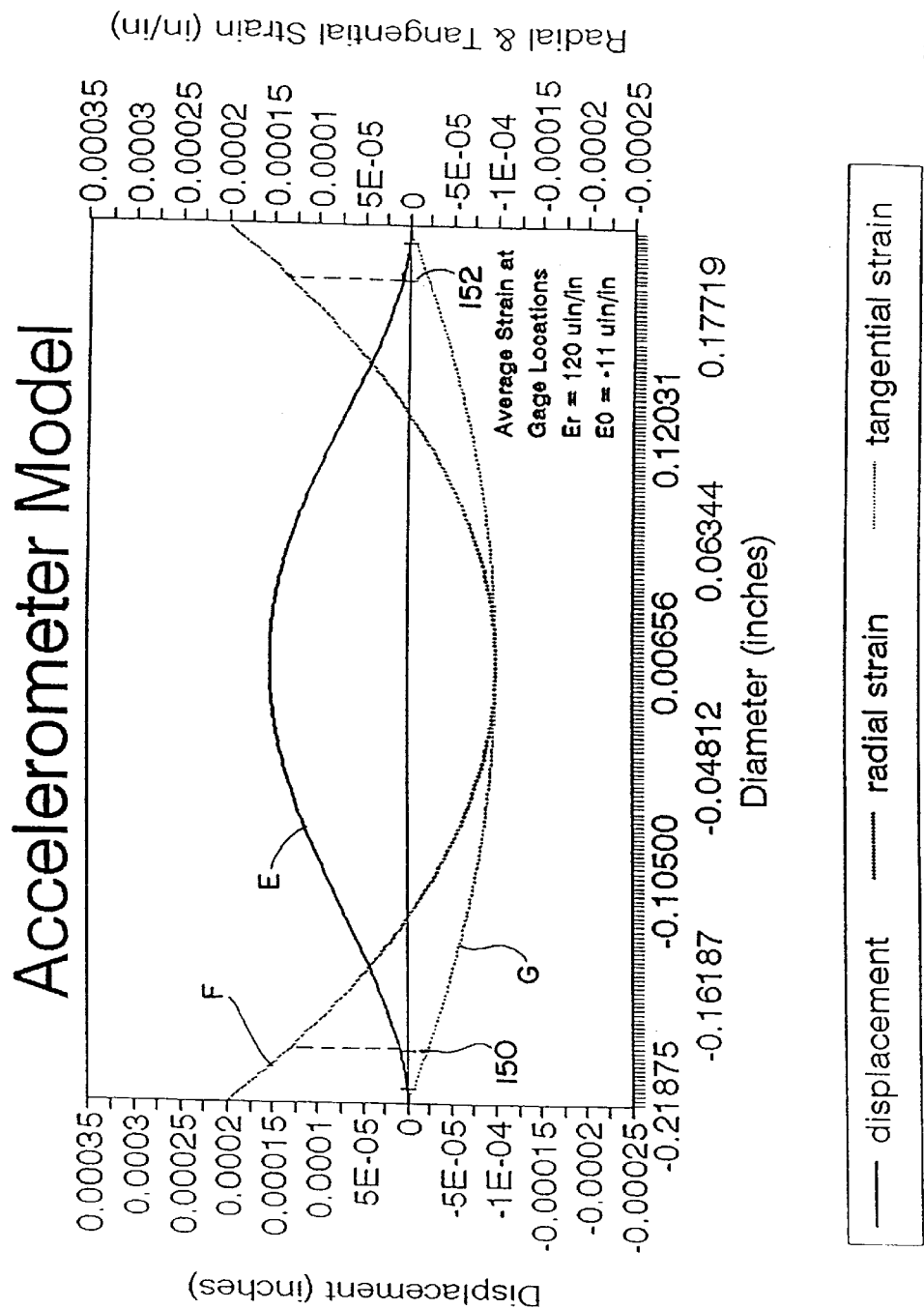
FIG. 12 is a graph showing the calculated flexure and strain responses of an edge-mounted diaphragm modeled in accordance with the present invention.

Referring briefly to FIG. 12, the results of modeling the response of the transducer 20 shown in FIG. 3 are shown. The horizontal axis represents the position (in inches) along the diameter of the unsupported central portion 46 of the diaphragm 34. The left vertical axis represents the displacement of the diaphragm 34 under an exemplary condition. The right vertical axis represents the radial and tangential strain (in inches per inch). Curve E shows the displacement of the diaphragm 34 under the given condition. Curve F illustrates the radial strain of the diaphragm 34 along its diameter in the central portion 46, and curve G shows the tangential strain. Marks 150 and 152 represent the respective locations of the pairs of strain gages T1, C1 and T2, C2 on the diaphragm 34. As is shown, the average radial strain seen by the strain gages is 120$\mu$in/in and the average tangential strain is −11 $\mu$in/in.

It is noted that the average radial strain at the strain gage locations 150 and 152 represents approximately 75% of the maximum radial strain. The average tangential strain represents approximately 25% of the maximum tangential strain. For a rim-supported diaphragm without apertures, the maximum displacement occurs at the center and the maximum strains are at the supports. See FIG. 12. When apertures are added near the rim support, the strains are increased without substantial change in the displacements. At the same time, the first resonant frequency of the transducer 20 is substantially higher than in conventional devices.

Returning to the preferred embodiment shown in FIG. 1, the support 12 of the acceleration transducer 10 comprises a retaining screw 162 and a base 164. As best illustrated in the exploded view shown in FIG. 13, the screw 162 has an externally-threaded shaft 166 integrally formed with a head 168. The base 164 has an internally threaded hole 169 therein which mates with the shaft 166, thereby allowing the screw 162 to be connected to the base 164. One end 170 of the base 164 has an integrally-formed generally hex bolt shape.

The transducer 10 preferably is enclosed in a sealed housing 171, which functions to protect the transducer 10 from moisture, dirt, and debris, as well as from larger foreign objects. The configuration of the housing 171 is not generally determined by design of the transducer 10, and the details of the housing 171 and the mounting and placement of the transducer 10 therein will depend on the requirements of the transducer application.

However, the housing 171 and/or the support 12 may include mechanical stops to limit movement of the diaphragm 14. An example is housing 171' shown in FIG. 14, which has surfaces 172 and 173 to limit the travel of the diaphragm 14. By limiting the movement of the diaphragm 14, damage to the diaphragm 14 may thereby be prevented.

Referring to FIGS. 13 and 15, the diaphragm 14 has a central hole 174 therein which allows the shaft 166 to pass therethrough. A dashed boundary line 176 indicates the boundary between the attachment portion 15, which is held by the support 12 (clamped or otherwise held between the head 168 of the screw 162 and the base 164), and the flexure portion 16. The strain gages 18 and 19 are mounted on the same side of the diaphragm 14, diametrically opposite each other.

Figure 16:
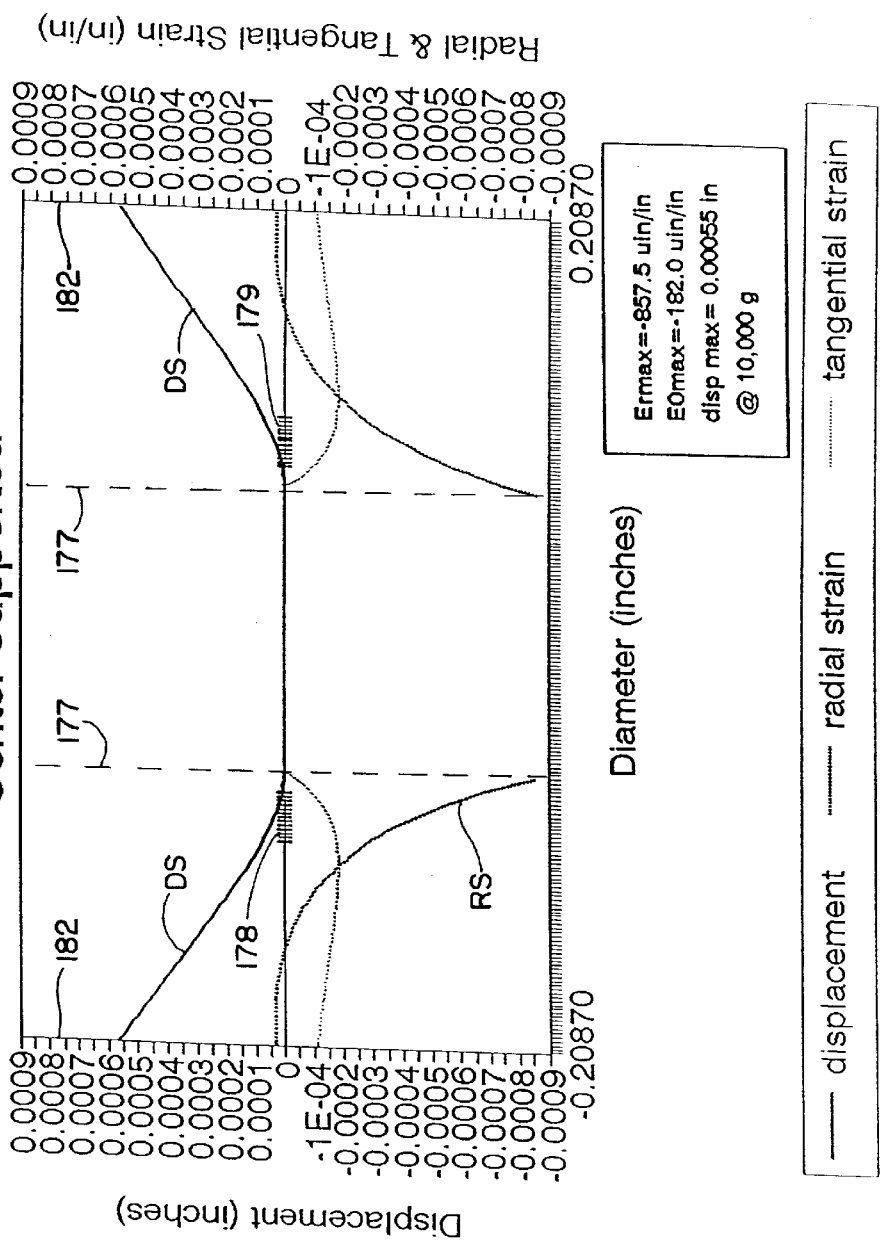
FIG. 16 is a graph of the displacement and strain in a center-mounted transducer.

The strain gages 18 and 19 are preferably located in the flexure portion 16 close to the boundary line 176. FIG. 16 shows radial strain RS and displacement DS as a function of radius for a flexing center-mounted transducer disk which does not include the below-described apertures and weakening holes. The radial strain RS is seen from FIG. 16 to be have a maximum absolute value at the boundary line 176, at radial location 177 in FIG. 16, where the displacement DS is zero. Therefore strain gage radial locations 178 and 179 of the strain gages 18 and 19 are chosen close to the boundary line 176, where the strain is high. Although the displacement of the diaphragm 14 is greater near its circumference 180, it is seen in FIG. 16 that the radial strain RS is at its lowest absolute value near radial location 182 of the circumference 180. Thus it is believed that the transducer 10 of the present invention is able to achieve a higher first resonant frequency as well as a stronger response by locating the strain gages 18 and 19 toward the boundary line 176 rather than towards the circumference 180.

In order to increase the sensitivity of transducer 10 via the strain gages 18 and 19, the present invention includes four apertures 184, two of the apertures 184 positioned adjacent each of the strain gages 18 and 19 on opposite sides thereof. The apertures 184 tend to exaggerate the strain which is incurred by the flexing diaphragm 14 towards the middle regions 186, which are between the pairs of apertures 184 and are where the respective strain gages 18 and 19 are located. It is believed that the apertures 184 amplify the strains in the middle regions 184 by a factor of two or three compared with the strains in the corresponding regions of a transducer without apertures, such as the one modeled in FIG. 16.

FIG. 17 is an enlarged view of the diaphragm 14 in the vicinity of the strain gage 18, showing the details of the apertures 184 and the middle region 186. Each of the apertures 184 has a straight inner edge 190. The straight inner edges 190 and the boundary 176 define a root 192 which connects the attachment portion 15 and the middle region 186. The root 192 is tapered, being relatively wide near the boundary 176, and narrowing to a width slightly greater than the width of the strain gage 18 where the root 192 meets the middle region 186. This tapered shape of the root 192 provides increased stiffness, thereby reducing the relative flexure of the root 192 and increasing the relative flexure in the middle region 186. The middle region 186 is bounded by edges 194 of the apertures 184. The edges 194 are preferably substantially parallel to the outer boundaries 196 of the strain gage 18. Each of the edges 194 defines at its ends corners 200 and 202. The corners 200 and 202 act as stress concentrators, with flexure of the diaphragm 14 occurring most prominently in the middle region 186 in the vicinity of the corners 200 and 202. The apertures 184 are designed such that the strain gage 18 is longer than and spans the middle region 186 between the respective pairs of the corners 200 and 202, thereby increasing the output response of the strain gage 18.

Referring briefly back to FIG. 15, a pair of weakening holes 204 is provided in the diaphragm 14. The holes 204 reduce the overall stiffness of the diaphragm 14. In addition, the holes 204 are preferably sized so as to balance the stiffness of the diaphragm 14, with the holes 204 giving substantially the same reduction of stiffness as the apertures 184. The holes 204 will preferably be diametrically opposed and adjacent the boundary line 176, with each of the holes 204 located substantially the same distance from each pair of the apertures 184, although the holes 204 may also be placed in other locations. The holes 204 will preferably be round for ease of manufacture, but may have other shapes.

It will be appreciated that the functions of the weakening holes 204 could alternatively be performed by use of an elliptical diaphragm 14', shown in FIG. 18. The elliptical diaphragm 14' has a length L1 along the axis containing the strain gages 18 and 19 that is greater than the width L2 in the direction perpendicular thereto. It will be appreciated that the elliptical diaphragm 14' may also be designed to contain weakening holes. While a round diaphragm such as the diaphragm 14 is preferred, the diaphragm may have other shapes.

Although FIG. 15 only shows strain gages 18 and 19, the transducer 10 includes on the opposite side of the diaphragm 14 strain gages 18' and 19' (not shown) for measuring compression type strains in the diaphragm 14 during downward flexure. The strain gages 18' and 19' are positioned in the same manner as gages 18 and 19 between the aperture pairs 184, but simply on the other side of the diaphragm 14. The strain gages 18 and 18', and 19 and 19' may be connected in complementary fashion such that the tensile strain measured by 18 is common to the compression strain measured by 18', for example. This arrangement of strain gages on the transducer 10 is analogous to the placement of the strain gages T1, T2, C1, and C2 on the diaphragm 34 of the transducer 20 described above and shown in FIG. 4. The strain gages 18, 18', 19, and 19' have wire leads (not shown) connected thereto which are also connected to appropriate circuitry (not shown) for processing the output of the strain gages. If necessary, the wire leads can be passed through openings in the diaphragm 14, either through the apertures 184 or the weakening holes 204. It will be appreciated that the strain gages 18, 18', 19, and 19' may be connected and operated in a Wheatstone bridge in a manner similar to the connection of the strain gages T1, T2, C1, and C2 described above and shown in FIG. 7.

Although it will be appreciated that stress would most effectively be concentrated in the middle region 186 if the corners 200 and 202 were sharp, in actuality the sharpness of the corners 200 and 202 is limited to prevent premature cracking and subsequent fatigue failure. As shown in FIG. 19, each of the apertures 184 has its rounded corners defined by first, second, and third circles 206, 208, and 210, respectively. The first circle 206 is located adjacent the boundary line 176. The second circle 208 is located further from the center of the diaphragm 14 and such that a line tangent to both of the circles 206 and 208 forms the inner edge 190 of the aperture 184, which gives the root 192 the desired tapered shape discussed above (see FIG. 17). The third circle 210 is located relative to the second circle 208 such that a line tangentially connecting the two circles 208 and 210, the edge 194, is substantially parallel to the outer boundaries 196 of the strain gages 18 and 19 as discussed above (see FIG. 17). A line tangentially connecting the second circle 208 and the third circle 210 completes the boundary of the aperture 184.

Although FIG. 15 shows a particular arrangement of the apertures and strain gages in accordance with the present invention, it will be appreciated that other combinations and arrangements are possible. For example, the diaphragm 14 may include more than four strain gages and apertures. Preferably, however, the strain gages are located in the flexure portion of the diaphragm toward the boundary between the flexure portion 16 and the attachment portion 15 in order to obtain a higher signal. In addition, one or more apertures are preferably provided for concentrating the strains incurred by the diaphragm towards the strain gages.

Further, although the apertures 184 pass completely through the diaphragm 14, it will be appreciated that strain concentration may by achieved in the vicinity of the strain gages without having holes in the diaphragm, for example by use of grooves in the diaphragm or areas of the diaphragm with reduced thickness. And while the strain gages 18 and 19 are shown as not overlapping the apertures 184, it will be appreciated that strain gages could be positioned to partially or fully overlap the apertures or other stress concentrators.

FIGS. 19 and 20 illustrate the relevant dimensions of the diaphragm 14 in accordance with an exemplary embodiment of the transducer 10. The diaphragm 14 has a diameter Dd of 0.4200 inch. The central hole 174 has a diameter Dh of 0.090 inch. Each of the apertures 184 is defined by the three circles 206, 208, and 210 in the manner described above, with each of the circles 206, 208, and 210 having a diameter Dc of 0.012 inch. Each first circle 206 is located a distance R1 of 0.0726 inch from the center C of the diaphragm 14. Each circle 206 is offset from a center line CL (on which the strain gages 18 and 19 are located) by an angle $\phi 1$, where $\phi 1$, equals 30.4602°. Each second circle 208 is located a distance R2 of 0.0861 inch from the center C, and is offset an angle $\phi 2$ of 11.0489° from the center line CL. Each third circle 210 is located a distance R3 of 0.0959 inch from the center C, and is offset an angle $\phi 3$ of 9.9042° from the center line CL. Each weakening hole 204 has a diameter Dw of 0.033 inch and is located a distance Rw of 0.0845 inch from the center C. The diaphragm 14 has a thickness Td of 0.025 inch.

The diaphragm 14 is preferably made of a hardened, corrosion resistant, fatigue resistant material. Exemplary materials are 316-type stainless steel, 304-type stainless steel, titanium, or other materials that have suitable properties. Also, in the illustrated and described embodiment the diaphragm 14 is made of stainless steel, which is electrically conductive; therefore, the strain gages 18, 18', 19, and 19', and, if necessary, their associated leads, are mounted on the diaphragm using electrically non-conducting adhesive to avoid shorting. The central hole 174, the apertures 184, and the weakening holes 204 may be formed or cut in the diaphragm 14 by processes such as machining, photoetching, stamping, or laser cutting.

If the diaphragm 14 is made of an electrically non-conducting material, such as a composite or a non-conducting laminated material, the adhesive used for mounting the strain gages and their associated leads need not be electrically non-conducting. Alternatively, if the diaphragm 14 is made of an electrically non-conducting material the strain gages could be formed directly on the diaphragm using a photolithography process.

A transducer 10 having the above-described construction has been found to have a first resonant frequency of over 20 KHz, due mainly to the small size and stiffness of the diaphragm and the small size and placement of the strain gages. The strain gages 18, 18', 19, and 19' are of commercially available design and are preferably of a semiconductor variety (e.g., silicon) which are bonded on the diaphragm 14 using established techniques. Such strain gages in combination with the diaphragm 14 have been found to produce an output response (normalized with respect to the voltage supplied to the Wheatstone Bridge) on the order of 0.004 millivolts/volt (mV/V) to 0.006 mV/V per g acceleration, where "g" is equal to the acceleration of gravity. In addition, the transducer is capable of measuring on the order of 10,000 g's of acceleration. In another embodiment, other types of strain gages can be used such, as foil type gages, etc. In either case, an extremely clean signal can be received from the strain gages.

As compared with the edge-clamped transducer 20 shown in FIG. 2, the center-clamped transducer 10 has the advantage of higher strain levels and thus increased sensitivity. These higher strain levels are produced because clamping the diaphragm at the center leaves a maximum amount of diaphragm mass free to flex. It will be appreciated that the diaphragm 14 may be modified by adding masses at its circumference or elsewhere to further increase sensitivity of the strain gage.

FIG. 21 shows such a diaphragm, a diaphragm 14" with added masses 220 attached to the diaphragm 14" at evenly spaced locations near circumferential edge 230. It will be appreciated that a greater or lesser number of masses may be used, that the masses need not be identical, and that they need not be placed symmetrically about the diaphragm 14".

FIGS. 22 and 23 illustrates how the transducer 10 can be used to measure the acceleration and/or velocity of an impact bar 300, also known as a Hopkinson bar. In FIG. 22, the impact bar 300 is secured by hinged connections 302 and 304. The bar 300 is struck at end 306 with great force by end 308 of an impacting bar or hammer 310, which is secured by hinged connections 312 and 314. The hinged connections 302, 304, 312, and 314 are also hinged at their mounting points 316 on supporting structure (not shown). As shown in FIG. 23, transducer 10 may be mounted to the bar 300 axially, on non-impacted end 318 of the bar 300, by use of a mounting block or housing 320. Alternatively the transducer 10 may be mounted offset from the axis of the bar 300, on the side of the bar 300, by use of a mounting block or housing 322. It will be appreciated that the aforementioned external circuitry for processing the signal from the transducer 20 may be located either in the mounting blocks or housings 320 and 322 or elsewhere remote from the blocks or housings 320 and 322 and the bar 300.

An advantage of the present invention is that because of the small size and hence small profile of the transducer 10, the mounting blocks or housings 320 and 322 also can have a small size and small profile relative to the bar 300. This enables the mounting blocks or housings 320 and 322 and transducer 10 to be securely mounted to the bar 300 with relatively little movement or vibration relative to the bar 300. Hence, the output from the transducer 10 has been found to produce a very clean signal.

Figure 24:
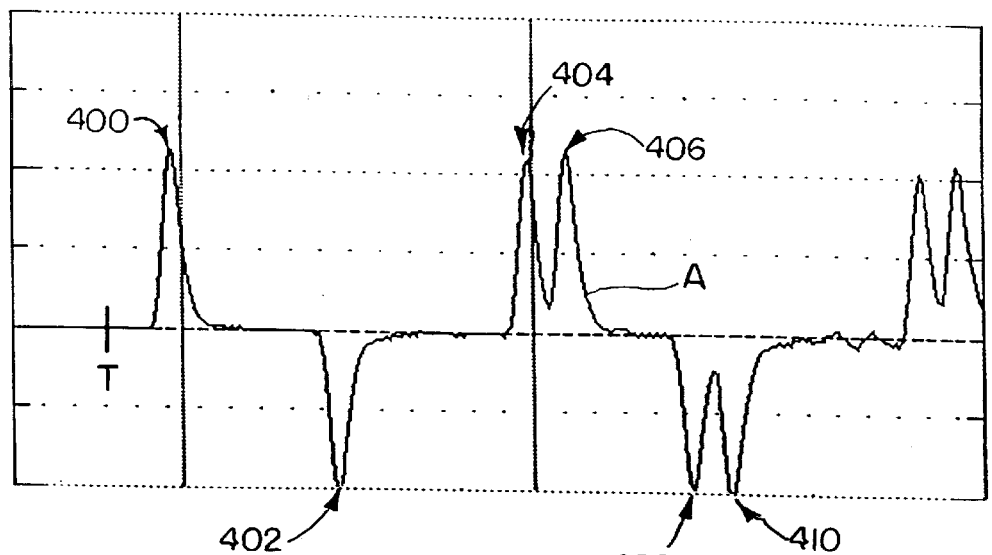
FIG. 24 is a waveform diagram illustrating an exemplary output from a center-mounted acceleration transducer in accordance with the present invention.
Figure 25:
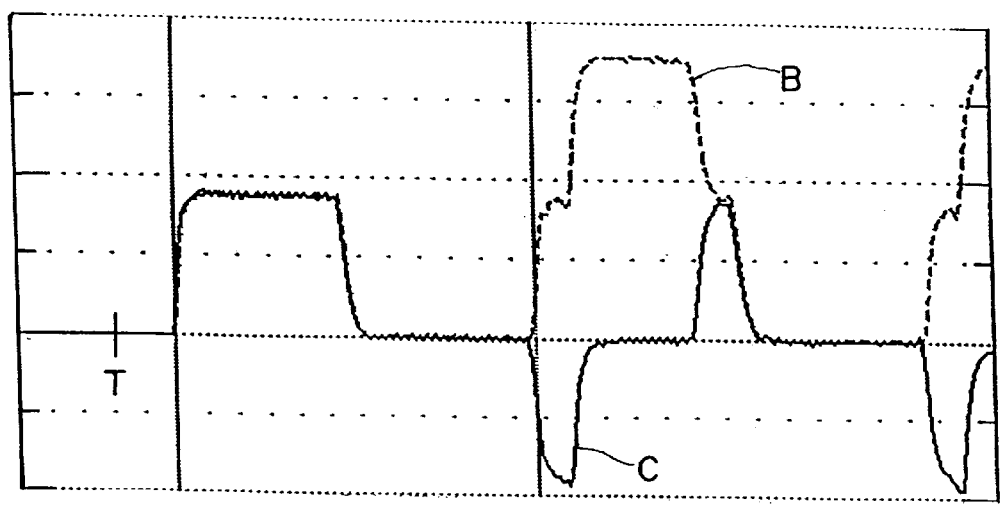
FIG. 25 is a waveform diagram illustrating velocities and forces calculated from the output of FIG. 24.

FIGS. 24 and 25 shows exemplary waveforms which are produced by the transducer 10 when mounted to an axially impacted bar in a Hopkinson bar test. The results shown in FIGS. 24 and 25 are from tests with the transducer 10 mounted close to the impacted end 306 of impacted bar 300, corresponding approximately to location 340 shown in FIG. 22. In both FIGS. 24 and 25 the horizontal axis represents time and the vertical axis represents the amplitude of the respective signals. Waveform A represents the acceleration of the bar 300 via the output signal provided by the strain gages in the transducer 10. Waveform B represents the velocity of the bar 300 computed by integrating the waveform A using a computer. Waveform C represents the force in a cross-section of the impacted bar 300, with compression forces being positive. The force is measured by strain gages (not shown) mounted directly on the impacted bar 300. It will be appreciated the force could also be calculated using known relationships between the force and the velocity of the bar, the modulus of elasticity of the bar material, the cross-sectional area of the bar, and the speed of sound in the bar material.

At time T, the bar 300 having the transducer 10 mounted thereto is struck by the impacting bar 310. This impact causes a compressive wave to propagate through both the impacting and impacted bars. The initial upward acceleration peak 400 represents the acceleration of the bar 300 in the vicinity of the transducer 10 as it accelerates from a stationary position towards a relatively constant velocity. Besides moving at a relatively constant velocity, the bar 300 in the vicinity of the transducer 10 is in compression.

The compressive wave in the impacting bar 310 is reflected at its free end 342 as a tensile wave. When this tensile wave reaches the point of contact between the impacting and impacted bars 310 and 300, the two bars separate, and a corresponding tensile wave begins to propagate through the impacted bar 300. The downward peak 402 in waveform A represents the deceleration of the bar 300 from the relatively constant velocity back to a stationary position due to this tensile wave. At this point the portion of the bar 300 in the vicinity of the transducer 10 is neither in tension nor compression.

The initial compressive wave which produced acceleration peak 400 is reflected by the free end 318 of the impacted bar 300 as a tensile wave. This tensile wave produces acceleration peak 404 when its effect is felt at the transducer 10. Upon reaching the originally-impacted end 306 of the impacted bar 300 the tensile wave is reflected as a compressive wave, which produces acceleration peak 406.

The tensile wave which produced downward peak 402 is reflected by the end 318 of the bar 300 as a compressive wave which propagates along the bar 300 to produce downward peak 408 and (after reflection at end 306 as a compressive wave) downward peak 410.

It will be appreciated that the appearance of the outputs shown in FIGS. 24 and 25 will vary greatly depending upon the type of acceleration being measured and the location of the transducer 10. However, the waveforms in FIGS. 24 and 25 illustrate the clean signal obtainable using an acceleration transducer of the present invention, avoiding the relatively large oscillations and noise which are found in outputs from existing devices placed near the impact end of a bar.

It is noted that the output of the transducer 10, 20 depends somewhat upon the damping effect of the air or other fluid in the chamber where the diaphragm 14, 34 is located. As the diaphragm 14, 34 flexes the volumes of the portions of the chamber above and below the diaphragm change. This causes the fluid filling the chamber to rush from one portion of the chamber to the other through the holes in the diaphragm 14, 34, such as the apertures 58 in the diaphragm 34 and the apertures 184 and the weakening holes 204 in the diaphragm 14. For the diaphragm 14, the fluid may also move through a gap between the circumference 180, which is not clamped, and the housing 171. This movement of fluid creates a viscous drag on the diaphragm 14, 34 which damps its motion. It will be appreciated that the damping effect described is affected by the configuration of holes in the diaphragm 14, 34 and, for the diaphragm 14, by the configuration of the gap as well. The damping is also affected by the type of fluid in the chamber. For example, damping could be increased by replacing the air in the chamber with oil. It will also be appreciated that the rushing of the fluid through the holes in the diaphragm 14, 34 may tend to change the temperature of the diaphragm 14, 34.

Figure 26:
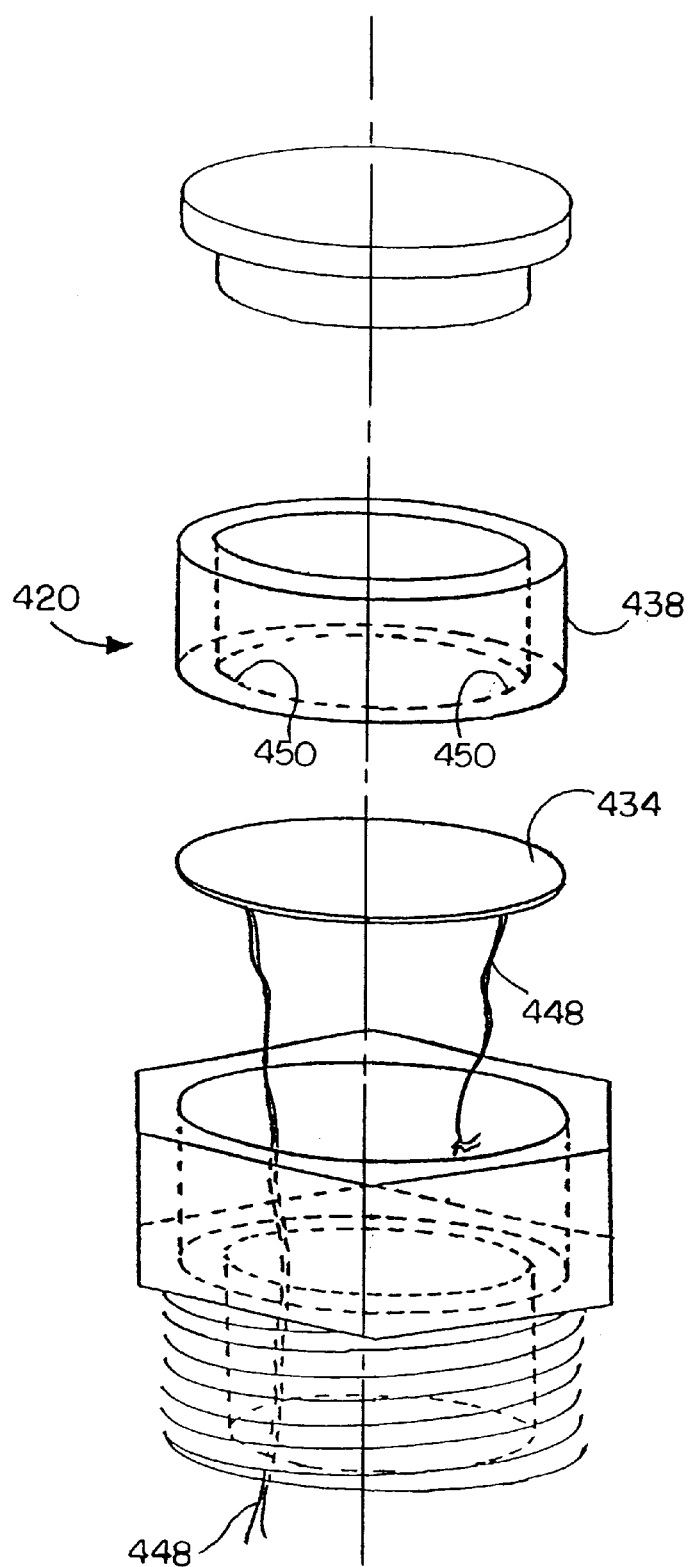
FIG. 26 is an exploded view of another alternative embodiment of the invention, a transducer which uses a strain concentration mechanism not involving apertures.

FIG. 26 shows another alternative embodiment of the invention, a transducer 420 which uses a strain concentration mechanism not involving apertures. Except as indicated below, the transducer 420 is similar to the transducer 20 shown in FIGS. 2-4 and described above.

The transducer 420 has a circular diaphragm 434 which is clamped along its perimeter by a clamping ring 438. Wire leads 448 are connected to strain gages (not shown) which are located on the bottom of the diaphragm 434. The leads 448 are connected to appropriate circuitry (not shown) for processing the output of the strain gages.

Strain concentration in the vicinity of the strain gages is accomplished by a sharp edge 450 along the bottom inside diameter of the clamping ring 438. The sharp edge 450 causes stresses to be concentrated in the portion of the diaphragm 434 near the clamping ring 438 as the diaphragm 434 flexes. This concentration of stress causes an increase in strain where the strain gages are located, which results in an increase output from the strain gages.

It will be appreciated that the sharp edge may be provided only along the portion of the bottom inside diameter of the clamping ring nearest the strain gages, as opposed to fully around the bottom inside diameter, as is shown.

It will further be appreciated that a strain concentration mechanism involving a sharp edge may also be employed with transducer having a center-clamped diaphragm.

It will be appreciated that although the transducers 10, 20, and 420 have been described above with respect to particular dimensions, materials, aperture arrangements, etc., the present invention is not necessarily limited to such dimensions, materials, etc. Such specific information is presented primarily for exemplary purposes. Other materials, dimensions, aperture arrangements, strain gage configurations, strain gage types, etc., can be used without departing from the scope of the invention. And while the diaphragms 14, 34, and 434 are preferably flat, other shapes such as a dish-like shape may be used.

As previously mentioned, different aperture arrangements and/or number of strain gages can also be utilized. Though the strain gages are preferably of a semiconductor type which can be formed directly on the diaphragm, other strain gages which can be applied to the diaphragm are also within the scope of the invention. The preferred embodiment configures the strain gages in a Wheatstone Bridge configuration, but other configurations are similarly possible.

It will be appreciated that piezoelectric devices may be substituted for one or more of the strain gages. Piezoelectric devices have the characteristic that a mechanical stress on the device produces a voltage across the device. The voltages in the piezoelectric devices can be measured using conventional means.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. In addition, while a particular feature of the invention may have been described above with respect to only one of several illustrated embodiments, such feature may be combined with one or more other features of the other embodiments, as may be desired and advantageous for any given or particular application.

What is claimed is:

1. An acceleration transducer comprising:
    a diaphragm responsive to inertially induced deformations so as to exhibit stress, strain, and deflection;
    a support connected to a part of the diaphragm; and
    at least one detector for producing an output in response to the deformation;
    wherein the diaphragm is the principal mass that is responsive to acceleration.

2. The acceleration transducer of claim 1, wherein the support rigidly secures the part of the diaphragm.

3. The acceleration transducer of claim 1, wherein the support is elastically attached to the part of the diaphragm.

4. The acceleration transducer of claim 1, wherein the support and the part of the diaphragm are hingedly connected.

5. The acceleration transducer of claim 1, wherein the connection between the support and the part of the diaphragm viscously damps movement of the diaphragm.

6. The acceleration transducer of claim 1, wherein the at least one detector produces an output at least in response to the stress exhibited by the deformations.

7. The acceleration transducer of claim 1, wherein the at least one detector produces an output at least in response to the deflection exhibited by the deformations.

8. The acceleration transducer of claim 1, wherein the at least one detector produces an output at least in response to the strain exhibited by the deformations.

9. The acceleration transducer of claim 8, wherein the at least one detector is at least one strain gage.

10. The acceleration transducer of claim 9, wherein the part of the diaphragm is an outer radial portion of the diaphragm, and the at least one strain gage is located on the outer radial portion.

11. The acceleration transducer of claim 10, wherein the diaphragm has a hole in a center portion of the diaphragm.

12. The acceleration transducer of claim 10, wherein the diaphragm includes a mass distributed over a center portion of the diaphragm.

13. The acceleration transducer of claim 9, wherein the part of the diaphragm is a center portion of the diaphragm, and the at least one strain gage is located on the center portion.

14. The acceleration transducer of claim 9, wherein the diaphragm includes a strain concentration mechanism to concentrate strain measured by the at least one strain gage.

15. The acceleration transducer of claim 9, wherein the diaphragm includes a sharp edge on the support positioned relative to the at least one strain gage to concentrate strain measured thereby.

16. The acceleration transducer of claim 1, wherein the at least one detector comprises a capacitance element.

17. The acceleration transducer of claim 1, wherein the at least one detector comprises an optical displacement element.

18. The acceleration transducer of claim 1, wherein the at least one detector comprises a piezoelectric element.

19. The acceleration transducer of claim 1, wherein the diaphragm is substantially elliptical in shape.

20. The acceleration transducer of claim 1, further comprising a mechanical stop which limits the deformations of the diaphragm.

21. The acceleration transducer of claim 1, further comprising a mass attached to the diaphragm to increase sensitivity of the at least one detector.

22. The acceleration transducer of claim 21, wherein the mass is attached to an outer radial portion of the diaphragm.

23. The acceleration transducer of claim 1, wherein the at least one detector is a means for producing an output in response to the deformations.

24. The acceleration transducer of claim 12, wherein the mass is an integrally formed part of the diaphragm.

25. The acceleration transducer of claim 1, wherein the diaphragm is unperforated, having no openings therethrough, and wherein the part of the diaphragm includes substantially all of a perimeter of the diaphragm.

26. The acceleration transducer of claim 1, wherein the transducer has a first resonant frequency of over 20 kilohertz.

27. The acceleration transducer of claim 1, wherein the transducer is operatively configured to measure accelerations on the order of 10,000 g's.

28. The acceleration transducer of claim 10, wherein the diaphragm includes a mass distributed over a center portion of the diaphragm.

29. The acceleration transducer of claim 1, further comprising means for converting the output to a measure of acceleration.

30. The acceleration transducer of claim 1, wherein the at least one detector includes first and second strain gages, the first strain gage being on a top face of the diaphragm and the second strain gage being on a bottom face of the diaphragm.

31. The acceleration transducer of claim 1, wherein the connecting includes clamping an outer radius of the diaphragm.

32. The acceleration transducer of claim 1, wherein the support and the part of the diaphragm are at least partially connected by a connection that involves viscous damping.

33. An acceleration transducer comprising:
    a diaphragm responsive to inertially induced deformations so as to exhibit stress. strain, and deflection:
    a support connected to a part of the diaphragm: and
    at least one detector for producing an output in response to the deformations;
    wherein the diaphragm is the principal mass that is responsive to acceleration, aend wherein the diaphragm includes at least one aperture positioned relative to the at least one detector.

34. The acceleration transducer of claim 33, wherein the at least one detector produces an output at least in response to the strain exhibited by the deformations.

35. The acceleration transducer of claim 34, wherein the at least one detector is at least one strain gage, and the at least one aperture concentrates strain measured thereby.

36. The acceleration transducer of claim 35, wherein the diaphragm includes two pairs of apertures which are radially opposed, and the at least one strain gage includes first and second strain gages respectively positioned between each pair of apertures.

37. The acceleration transducer of claim 36, wherein the first and second strain gages are positioned on a first side of the diaphragm.

38. The acceleration transducer of claim 37, further comprising third and fourth strain gages respectively positioned between each pair of apertures on a second side of the diaphragm.

39. The acceleration transducer of claim 38, wherein the first second, third and fourth strain gages are electrically connected in a bridge configuration.

40. The acceleration transducer of claim 38, further comprising an instrument for measuring the output of the strain gages.

41. The acceleration transducer of claim 36, wherein each aperture of the pairs of apertures includes a pair of corners adjacent one of the strain gages, whereby strain is concentrated at the corners when the diaphragm is flexed.

42. The acceleration transducer of claim 36, wherein the diaphragm includes a pair of weakening holes to reduce the stiffness of the diaphragm.

43. The acceleration transducer of claim 42, wherein the weakening holes are radially opposed.

44. The acceleration transducer of claim 43, wherein the weakening holes are each substantially equidistance from each pair of apertures.

45. The acceleration transducer of claim 36, further comprising a fluid which moves through the apertures when the diaphragm is flexed.

46. The acceleration transducer of claim 45, wherein the movement of the fluid damps motion of the diaphragm.

47. The acceleration transducer of claim 46, wherein the fluid is air.

48. The acceleration transducer of claim 46, wherein the fluid is oil.

49. The acceleration transducer of claim 45, wherein the movement of the fluid changes the temperature of the diaphragm.

50. The acceleration transducer of claim 39, wherein the strain gages in the bridge configuration have an output response of 0.0019 to 0.0063 MV/V per g.

51. The acceleration transducer of claim 50, wherein the strain gages in the bridge configuration have an output response of 0.004 to 0.006 MV/V per g.

52. An acceleration transducer, comprising:
  a housing;
  a diaphragm disposed within the housing such that the circumference of the diaphragm sits on an annular step which is formed in the housing;
  a clamping ring for rigidly clamping the circumference of the diaphragm between the clamping ring and the annular step while leaving a central portion of the diaphragm free to stress in response to acceleration of the housing; and
  at least one strain gage secured to the diaphragm for producing an output representative of the acceleration, the at least one strain gage being located towards an outer radial portion of the diaphragm.

53. The acceleration transducer of claim 52, wherein the diaphragm and housing are made of the same type of material to avoid galvanic corrosion.

54. The acceleration transducer of claim 52, wherein the diaphragm and housing are made of the same type of material to avoid temperature induced strain.

55. A method of evaluating the integrity of a bar, comprising the steps of:
  assembling an acceleration transducer, including the substeps of:
    connecting a diaphragm to a support such that the diaphragm is the principal mass that is responsive to acceleration, and
    operationally coupling at least one detector to the diaphragm for producing an output in response to deformation of the diaphragm; securing the transducer to the bar; monitoring output of the transducer in response to an impact on the bar.

56. The method of claim 55, wherein the securing the transducer to the bar includes the substeps of securing the transducer to a mounting block, and securing the mounting block to the bar.

57. The method of claim 51, further comprising using the output to calculate velocity or acceleration of the bar.

58. A method of measuring acceleration of an object, comprising:
  mounting an acceleration transducer to the object, the acceleration transducer including a diaphragm responsive to inertially induced deformations so as to exhibit stress, strain, and deflection; a support connected to a part of the diaphragm; and at least one detector for producing an output in response to the deformations; wherein the diaphragm is the principal mass that is responsive to acceleration;
  measuring the output while the object is subjected to an acceleration; and
  converting the output into a measure of the acceleration.

59. The method of claim 58, wherein the at least one detector is at least one strain gage, and wherein the measuring includes measuring output of the at least one strain gage.

60. The method of claim 59, wherein the at least one strain gage includes first, second, third, and fourth strain gages electrically connected in a bridge configuration, and wherein the measuring includes measuring the output of the bridge.

61. The method of claim 58, wherein the diaphragm includes a mass distributed over a center portion of the diaphragm.

62. The method of claim 58, wherein the transducer has a first resonant frequency of over 20 kilohertz.

63. The method of claim 58, wherein the acceleration is on the order of 10,000 g's.

64. A method of making an acceleration transducer, comprising:
  designing a diaphragm as a principal mass that is responsive to acceleration;
  assembling the transducer by connecting a support to a part of the diaphragm, and configuring at least one detector to produce an output in response to inertially induced deformations in the diaphragm.

65. The method of claim 64, wherein the designing includes designing the diaphragm such that the transducer has a first resonant frequency of over 20 kilohertz.

66. The method of claim 64, wherein the designing includes designing the diaphragm to measure accelerations on the order of 10,000 g'

67. The method of claim 64, wherein the configuring at least one detector includes attaching at least one strain gage to the diaphragm, and wherein the designing includes providing mechanical amplification of strains in the vicinity of the at least one strain gage.

68. The method of claim 67, wherein the providing mechanical amplification includes positioning one or more apertures in the diaphragm relative to the at least one strain gage.

69. The method of claim 64, wherein the configuring at least one detector includes attaching at least one strain gage to the diaphragm, and wherein the designing includes facilitating wiring of the at least one strain gage.

70. The method of claim 69, wherein the providing facilitating wiring includes positioning one or more apertures in the diaphragm relative to the at least one strain gage.

71. The method of claim 64, wherein the designing includes providing the diaphragm with means for accommodating deformation of a damping material.

72. The method of claim 71, wherein the deformation of a damping material includes flow of a damping fluid.

73. The method of claim 64, wherein the designing includes configuring the diaphragm to have a first mode frequency in excess of a specified value over a specified range of accelerations.

74. The method of claim 73, wherein the configuring the diaphragm includes providing the diaphragm with a mass distributed over a center portion of the diaphragm.

75. The method of claim 74, wherein the providing includes selecting the material of the mass.

76. The method of claim 74, wherein the providing includes selecting the diameter and thickness of the mass.

77. The method of claim 74, wherein the mass distributed over the center portion includes a separate added mass.

78. The method of claim 74, wherein the mass distributed over the center portion includes an integrally-formed added mass.

* * * * *